United States Patent [19]
Wettlaufer

[11] Patent Number: 4,892,665
[45] Date of Patent: Jan. 9, 1990

[54] METHOD AND PRESS FOR PRESSING LIQUID FROM THIN LAYERS OF LIQUID CONTAINING MASSES

[76] Inventor: Dale E. Wettlaufer, 7930 Clinton St., Elma, N.Y. 14059

[21] Appl. No.: 558,181

[22] Filed: Dec. 5, 1983

[51] Int. Cl.⁴ .................. B01D 25/12; B01D 29/12
[52] U.S. Cl. ..................... 210/770; 100/37; 100/197; 100/198; 100/202; 210/225; 210/228; 383/86; 383/86.1; 383/99
[58] Field of Search .......... 100/37, 196, 197, 198, 100/202; 210/225, 227, 228, 236, 350, 351, 356, 770; 383/86, 87, 84, 98, 99, 86.1

[56] References Cited

U.S. PATENT DOCUMENTS

| | | | |
|---|---|---|---|
| 184,595 | 11/1876 | Cussen | 383/99 |
| 218,879 | 8/1879 | Hartshorn | 210/236 X |
| 1,131,032 | 3/1915 | Berrigan | 100/202 |
| 2,346,375 | 4/1944 | Harris | 100/202 |
| 2,764,339 | 9/1956 | Owens | 383/98 |
| 2,943,738 | 7/1960 | Schmidt, Jr. | 210/236 X |
| 3,204,769 | 9/1965 | Davis | 210/236 X |
| 4,219,425 | 8/1980 | Yoshida | 210/225 |
| 4,397,744 | 8/1983 | Haruo | 210/225 |
| 4,421,150 | 12/1983 | Masters | 383/86 |

FOREIGN PATENT DOCUMENTS

299676 5/1964 Netherlands .................. 210/225

Primary Examiner—W. Gary Jones
Attorney, Agent, or Firm—Joseph P. Gastel

[57] ABSTRACT

A press for pressing liquid from thin layers of liquid-containing masses including a frame, first and second spaced fixed platens on the frame, a movable platen between the first and second fixed platens for dividing the press into first and second operating sections, first and second bag-carrying frames in the first and second operating sections, first and second series of racks on the first and second bag-carrying frames, first and second series of bags interspersed with the first and second series of racks, the bags having downwardly converging side seams from open tops, pivot means mounting the first and second bag-carrying frames for pivotal movement between first positions wherein the bags have their open tops facing upwardly and second positions outside of the frame where the bags have their open tops facing downwardly, and motor mechanism for selectively moving the movable platen toward and away from each of the fixed platens.

28 Claims, 6 Drawing Sheets

METHOD AND PRESS FOR PRESSING LIQUID FROM THIN LAYERS OF LIQUID CONTAINING MASSES

BACKGROUND OF THE INVENTION

The present invention relates to an improved method and press for extracting the liquid from liquid-containing masses, such as cider from apple pomace.

By way of background, it has been found that the best cider is made by pressing relatively thin layers of apple pomace wrapped in cloth between racks. However, this procedure in the past was extremely labor-intensive because each layer had to be wrapped in a separate cloth and thereafter placed between racks for pressing and thereafter the cloth had to be unwrapped manually to dispose of the pomace residue. In order to overcome the foregoing labor-intensive procedure, various other types of presses were used, such as screw presses, centrifuges and belt presses but they were incapable of extracting juice from multiple thin layers.

A prior press is known which presses a bag of pomace on each side of a fixed platen by means of a movable platen on each opposite side of the fixed platen. These bags are loaded by placing pomace into an open top and they are unloaded by opening the bottoms. However, the problem with the foregoing press is that the bags have to be shaken in the press and the residue cannot be removed easily, thereby requiring the use of press aids which gives the cider an off taste. These press aids can comprise anything such as rice hulls, wood shavings, straw and the like. In addition, the foregoing prior press can press only two thin bags at a time because a clamping mechanism, which closes the bottoms of the bags during pressing and which is opened to open the bottoms of the bags for dumping, precludes the use of more than one bag at each side of the fixed platen, thereby having an extremely low capacity.

It is with an improved press which overcomes the foregoing deficiencies that the present invention is concerned.

SUMMARY OF THE INVENTION

It is accordingly one object of the present invention to provide an improved method of pressing and a press which will press a plurality of layers of liquid containing masses in cloth bags simultaneously and from which the residue may be dumped in an extremely simple and efficient manner.

Another object of the present invention is to provide an improved press having a plurality of operating sections containing first and second series of vertical bags which can be alternately pressed while the other section is being dumped and refilled, thereby providing a continuous pressing operation.

A further object of the present invention is to provide an improved press wherein the dumping of the residue is effected by inverting the residue-containing bags which were pressed and causing the residue to be deposited laterally outside of the pressing area, thereby in no way interfering with the tank under the press which catches the juice.

Yet another object of the present invention is to provide an improved bag construction in which the side seams converge toward the bottom so as to facilitate the ejection of residue when the bag is inverted.

Yet another object of the present invention is to provide an improved press having a plurality of vertically oriented racks between which a plurality of vertically oriented bags are held and from which the bags can be removed in an extremely simple and expedient manner for washing and which permits the racks to be hosed clean while still mounted on the press, thereby greatly reducing the clean-up of the press. Other objects and attendant advantages of the present invention will readily be perceived hereafter.

The present invention relates to a press for pressing liquid from a liquid-containing mass comprising a frame, first and second spaced vertical platens, a plurality of vertical racks, first mounting means for mounting said plurality of vertical racks between said first and second vertical platens in substantially parallel relationship to each other and to said first and second platens, a plurality of porous bags for receiving said liquid-containing mass, second mounting means for mounting said plurality of porous bags in interspersed relationship with said plurality of vertical racks, means for effecting relative movement of said first and second platens toward each other to cause said racks to effect a pressing relationship with said bags to force liquid out of said liquid-containing mass in said bags and to cause said first and second platens to move away from each other to terminate the pressing relationship between said racks and said porous bags.

The present invention also relates to a porous bag for mounting in a press for pressing liquid from a liquid-containing mass comprising first and second porous fabric side walls each having bottom edges and a pair of side edges and top edges, first seam means connecting said bottom edges to each other, second seam means connecting said side edges and converging toward said bottom edges, and said top edges having an opening therebetween for receiving said liquid-containing mass.

The present invention also relates to a porous bag for use in a press for pressing liquid from a liquid-containing mass and having a frame located between a pair of platens and having means for moving said frame between an upright position between said platens and an inverted position outside of said platens: the porous bag comprising first and second porous fabric side walls each having bottom edges and a pair of side edges and top edges, first seam means connecting said bottom edges to each other, second seam means connecting said side edges and converging toward said bottom edges, said top edges having an opening therebetween for receiving said liquid-containing mass, and means connecting said porous bag relative to said frame so that said opening is facing upwardly with said side seams converging downwardly when said frame is in said upright position between said pair of platens, and so that said opening is facing downwardly with said side seams diverging downwardly when said frame is in said inverted position outside of said platens.

The present invention also relates to a press for pressing liquid from a liquid-containing mass comprising a first frame, spaced horizontal frame members on said first frame, first and second vertical stationary platens spacedly mounted on said horizontal frame members, a horizontally movable vertical platen mounted on said horizontal frame members and having a first side facing said first stationary platen and a second side facing said second stationary platen, a plurality of first horizontally spaced vertical racks, first mounting means mounting said first vertical racks between said first fixed platen and said first side of said movable platen, a plurality of second horizontally spaced vertical racks, second mounting means mounting said second racks between said second fixed platen and said second side of said movable platen, a plurality of first porous bags having first openings at their upper ends, third mounting means mounting said first porous bags between said first racks, a plurality of second porous bags having second openings at their upper ends, fourth mounting means mounting said second porous bags between said second racks, and linkage means for moving said movable platen toward and away from said first and second fixed platens whereby liquid-containing masses in said first or second bags may be pressed while the solids remaining after pressing in the other of said first or second bags may be removed and additional liquid-containing masses may be placed into said other of said first or second bags.

The present invention also relates to a method for pressing liquid from liquid-containing masses comprising the steps of mounting a plurality of relatively thin porous bags having openings between racks on a frame with said openings facing upwardly, filling liquid-containing masses into said plurality of relatively thin porous bags through said openings, applying a pressing force to each of said plurality of relatively thin bags through said racks to press liquid from said liquid-containing masses therein, relieving said pressing force from said bags, and inverting said bags to discharge therefrom the residue of said liquid-containing masses.

The various aspects of the present invention will be more fully understood when the following portions of the specification are read in conjunction with the accompanying drawings wherein:

DESCRIPTION OF THE PREFERRED EMBODIMENTS

The following description will refer specifically to a cider press for which it was developed, but it will be understood that it may be used for pressing liquid from other liquid-containing masses.

The improved cider press 10 of the present invention includes a frame 11 having legs 12, 13, 14 and 15 which are in the form of angles. Legs 13 and 14 are connected at their bottoms by an angle 16 and legs 12 and 15 are connected at their bottoms by an angle 17. A strut 19, in the nature of an inverted channel, connects the midpoint of angles 16 and 17. A pan 20 for collecting extracted liquid rests on angles 16 and 17 and strut 19. The upper portions of legs 14 and 15 are connected to horizontal channel 21, and the upper portions of legs 12 and 13 are connected to horizontal channel 22.

The outer ends of channels 21 and 22 proximate legs 13 and 14 are connected to a box member 23 by suitable bolts and brackets (not numbered). A fixed platen 24 (FIGS. 1 and 3B) includes a backup steel plate 24' which has its central portion fixedly secured, as by welding, to box member 23. A steel plate 25 has its central portion 26 welded to box member 23 and its upper and lower ends 27 and 29 welded to plate 24'. A thick plastic sheet 30 is suitably secured, as by screws, to platen plate 24'.

Figure 3:
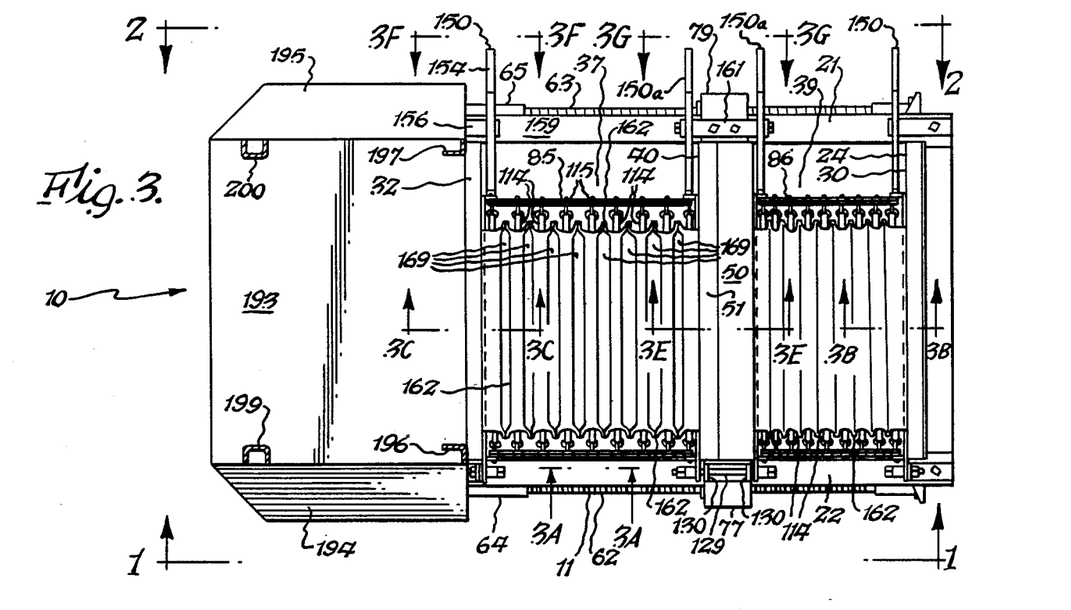
FIG. 3 is a cross sectional view taken substantially along line 3—3 of FIG. 1 and showing a partial plan view of the press without the grinder.
Figure 3A:
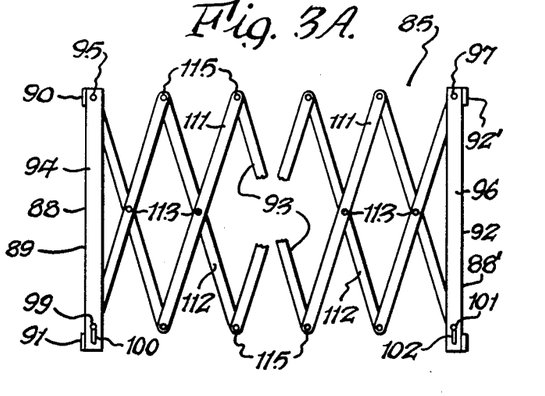
FIG. 3A is a fragmentary side elevational view of the scissors linkages taken substantially in the direction of arrows 3A—3A of FIG. 3.
Figure 3B:
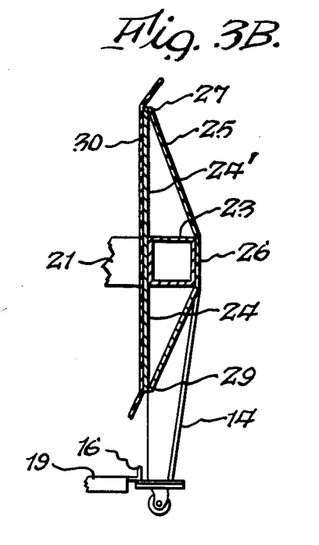
FIG. 3B is a fragmentary cross sectional view taken substantially along line 3B—3B of FIG. 3 and showing the structure associated with one of the fixed platens.
Figure 3C:
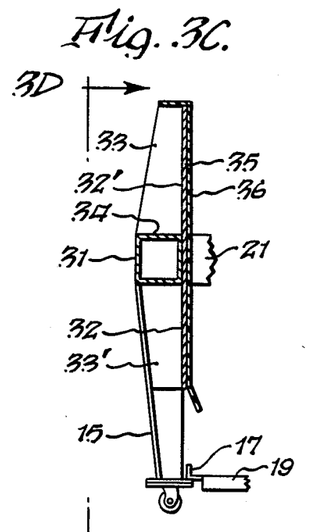
FIG. 3C is a fragmentary cross sectional view taken substantially along line 3C—3C of FIG. 3 and showing the structure associated with the other fixed platen.
Figure 3D:
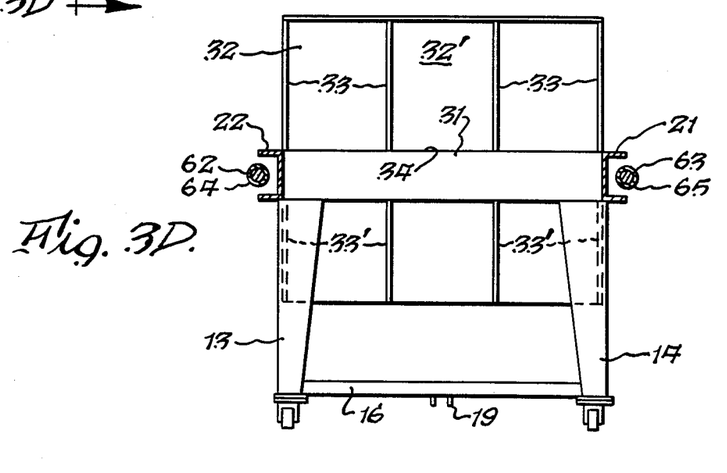
FIG. 3D is a fragmentary view taken substantially in the direction of line 3D—3D of FIG. 3C and showing the support structure for the fixed platen.

The ends of channels 21 and 22 proximate legs 12 and 15 are fixedly connected to box section 31, as by welding (FIG. 3C). A fixed platen 32 includes backup steel plate 32' which is secured to box section 31, as by screws or welding. Four gussets 33 have their lower ends welded to the upper side 34 of box section 31 and their edges 35 welded to fixed platen backup plate 32'. Four gussets 33' (FIG. 3D) are mirror images of gussets 33 and have their upper ends welded to the underside of box member 31 and their sides welded to backup plate 32' (FIG. 3C). Legs 12 and 15 are secured to the outer gussets 33 and their upper ends are welded to box member 31. A thick plastic sheet 36 is suitably secured to backup plate 32', as by screws (not shown).

The press 10 is divided into two operating sections 37 and 39 by a movable platen 40. Platen 40 comprises a peripheral frame consisting of steel side walls 41 and 42 (FIGS. 1, 2 and 3E), a top wall 43 and a bottom wall 44. A box section 38 extends between side walls 41 and 42 (FIG. 6) and its opposite sides bear against steel plates 45 and 46 which form end walls associated with the enclosure formed by side walls 41, 42, 43 and 44. A thick plastic sheet 47 covers plate 45 and a thick plastic sheet 49 covers plate 46. Plastic sheet 49 is turned over top side wall 43 at 50, and plastic sheet 47 is turned over top side wall 43 at 51, and the sheet portions 50 and 51 are secured in lapped relationship by screws (not shown).

Figure 1:
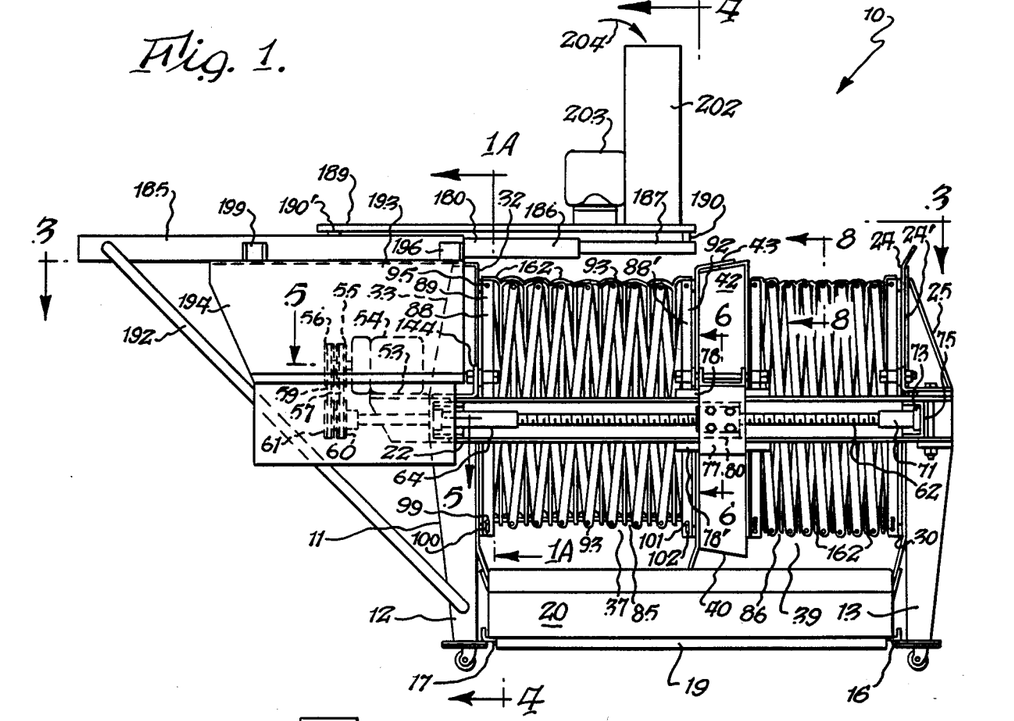
FIG. 1 is a side elevational view of one side of the improved press taken in the direction of arrows 1—1 of FIG. 3.
Figure 2:
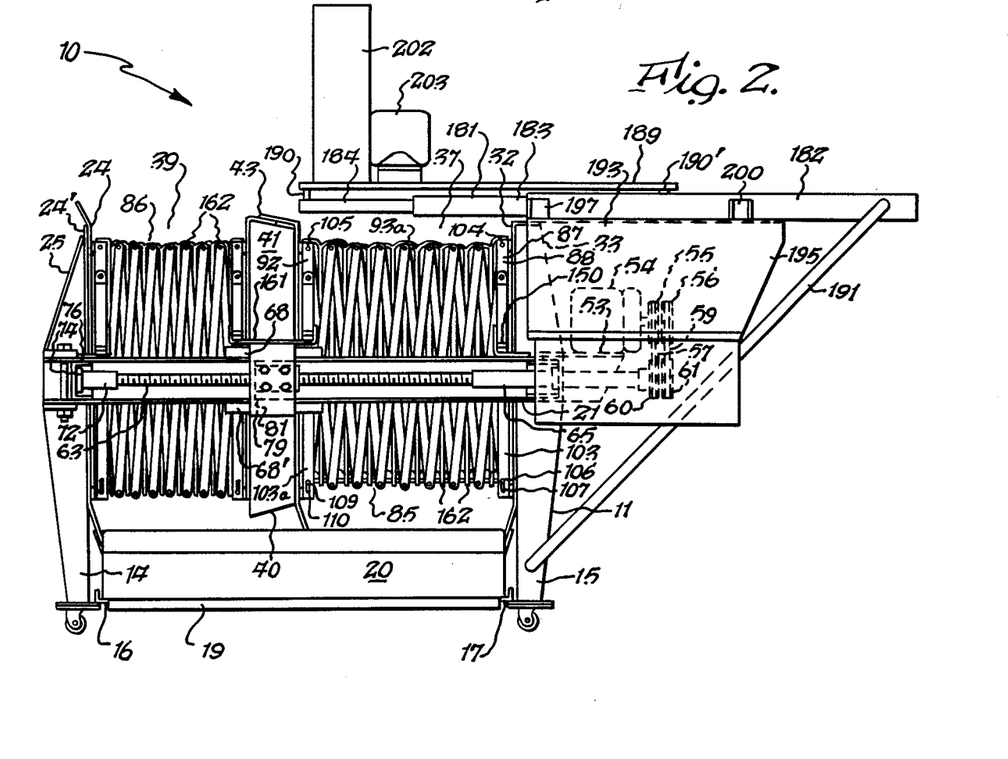
FIG. 2 is a side elevational view of the other side of the press taken in the direction of arrows 2—2 of FIG. 3.
Figure 3E:
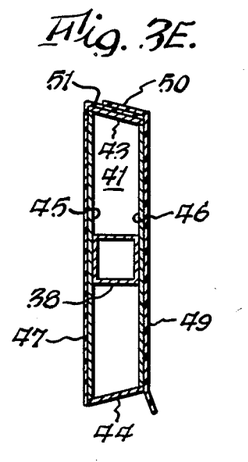
FIG. 3E is a cross sectional view taken substantially along line 3E—3E of FIG. 3 and showing the structure of the movable platen.

Movable platen 40 is moved back and forth between fixed platens 24 and 32 by the following structure: A shelf 53 is suitably secured to box member 34 (FIG. 5) for mounting electric motor 54. Sprockets 55 and 56 are keyed to the output shaft of motor 54 and are encircled by chains 57 and 59, respectively, which in turn encircle sprockets 60 and 61, respectively, effectively keyed to feed screws 62 and 63, respectively. The ends of feed screws 62 and 63 proximate motor 54 are fixedly secured to sleeves 64 and 65, respectively, which have reduced diameter extensions 64' and 65', respectively, attached thereto. Brackets 69 and 70 are fixedly secured to channels 22 and 21, respectively, and extensions 64' and 65' extend through these brackets. Radial bearings 69' and 70' encircle extensions 64' and 65', respectively, and are fixedly mounted on brackets 69 and 70, respectively. Thrust bearings 66 and 67 are interposed between sleeves 64 and 65 and brackets 69 and 70, respectively. The ends of feed screws 62 and 63 remote from motor 54 are mounted in sleeves 71 and 72, respectively, (FIGS. 1 and 2). Thrust bearings 73 and 74 are mounted on brackets 75 and 76, respectively, which are secured to the ends of channels 22 and 21, respectively. No axial bearings are required at brackets 75 and 76. A reduced diameter extension (not shown) of sleeves 71 and 72 is received in bores (not shown) in brackets 75 and 76, respectively, to support the shafts against radial movement.

The following connections couple movable platen 40 to feed screws 62 and 63. U-shaped brackets 77 and 79 (FIG. 6) are welded to side walls 41 and 42. Ball bearing sleeves 80 and 81 are bolted to webs 82 and 83 of brackets 77 and 79, respectively. Feed screws 62 and 63 are received in threaded relationship in ball bracket sleeves 80 and 81, respectively. It will therefore be appreciated that as feed screws 62 and 63 rotate, movable platen 40 will travel axially of feed screws 62 and 63, the direction of travel being dependent on the direction of rotation of the feed screws. Bearing blocks 68 and 68' (FIGS. 1 and 6) are secured to the legs of bracket 79 and ride on the legs of channel 22 to stabilize movable platen 40. Bearing blocks 78 and 78' are secured to the legs of bracket 77 (FIGS. 2 and 6) and ride on the legs of channel 21 to stabilize movable platen 40.

Figure 1A:
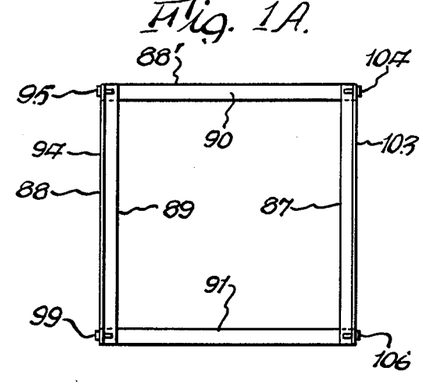
FIG. 1A is a side elevational view of the end portion of the collapsible frame taken substantially in the direction of arrows 1A—1A of FIG. 1.

The structure in both operating sections 37 and 39 is substantially identical and includes frames 85 and 86, respectively, for supporting bags which are filled with crushed apples and thereafter pressed. Frame 85 includes a square frame member 88 (FIG. 1A) consisting of angles 87 and 89 connected at their upper ends by bar 90 and at their lower ends by bar 91. Frame 85 also includes a frame member 92 (FIGS. 1 and 3A) which is substantially the mirror image of frame member 88. An expandable scissors linkage 93 (FIGS. 1, 2 and 3A) has its upper left end pinned to leg 94 of angle 89 at 95 and has its upper right end pinned to mirror image counterpart 96 of angle 89 at 97 (FIGS. 1 and 3A). The lower left end of scissors linkage 93 has a pin 99 which rides in slot 100 of leg 94 of angle 89 (FIGS. 1 and 3A). The lower right end of scissors linkage 93 carries a pin 101 which rides in slot 102 of angle 96. The opposite side of frame 85 includes a counterpart scissors linkage 93a which is essentially the mirror image of scissors linkage 93. The upper right end of scissors linkage 93a is pinned to the leg 103 of angle 87 at 104 (FIGS. 1A and 2). The upper left end of scissors linkage 93a is pinned at 105 to the mirror image counterpart 103a of angle leg 103. The lower right end of scissors linkage 93a is mounted on a pin 106 which rides in the slot 107 in leg 87 (FIG. 2). The lower left end of scissors linkage 93 is mounted on a pin 109 which rides in slot 110 of leg 103a which is the counterpart of leg 103. It will be appreciated that as movable platen 40 moves toward and away from fixed platen 32, the scissors linkages 93 and 93a will collapse and expand as the elongated links 111 and 112 pivot relative to each other about pins 113 (FIG. 3A) which secure them at their midpoints. In essence the scissors linkages 93 and 93a are parallelogram type linkages of the type generally associated with collapsible gates and the like. The slots 100, 102, 107 and 110 of FIGS. 1 and 2 allow for the variation in height of the scissors linkages 93 and 93a as they expand and contract.

Figures 5, 6, 7, 8, 9, 10:
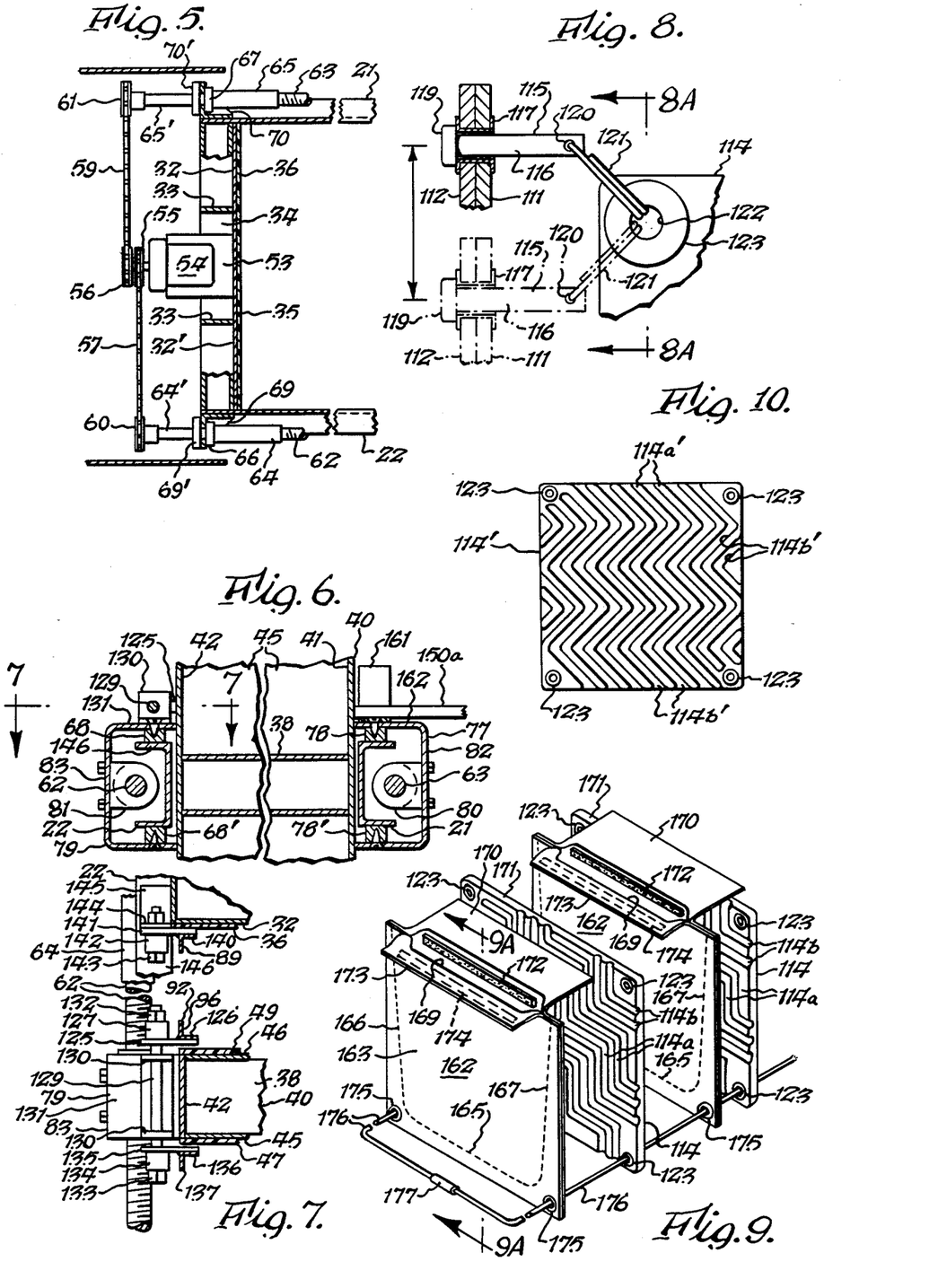
FIG. 5 is cross sectional view taken substantially along line 5—5 of FIG. 1 and showing the press drive mechanism.
FIG. 6 is a fragmentary cross sectional view taken substantially along line 6—6 of FIG. 1 and showing the drive connection between the movable platen and the feed screws.
FIG. 7 is a fragmentary cross sectional view taken substantially along line 7—7 of FIG. 6 and showing the pivotal connections for mounting one of the bag carrying frames.
FIG. 8 is an enlarged fragmentary cross sectional view taken substantially along line 8—8 of FIG. 1 and showing the structure for supporting the racks on the scissors linkage.
FIG. 9 is a fragmentary exploded view showing the relationship between the bags and the racks.
FIG. 10 is a side elevational view of a modified form of rack.
Figure 8A:
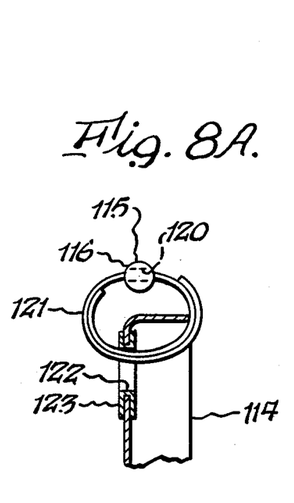
FIG. 8A is a fragmentary cross sectional view taken substantially along line 8A—8A of FIG. 8 and showing details of the mounting arrangement for the racks.

As expressed briefly above, in order to obtain the optimum quality and yield of cider, the crushed apples must be squeezed in thin layers. Further, as indicated above, the optimum quality is obtained by pressing through cloth. The press of the present invention achieves the foregoing in a highly efficient manner by simultaneously pressing a plurality of vertical layers. More specifically, a plurality of racks 114 are connected between opposite scissors linkages in the following manner. Headed pins 115 have their shanks 116 extending through hollow rivets 117 which secure the upper ends of links 111 and 112 to each other (FIGS. 8 and 8A). Shanks 116 can rotate in hollow rivets 117. The enlarged head 119 on each pin 115 prevents it from moving through rivet 117 (FIG. 8). The opposite end of shank 116 has a hole 120 therein which receives a circular spring clip 121 which also passes through aperture 122 in grommet 123 which is located at the corner of rack 114. As can be seen from FIG. 9, there is a grommet 123 at each of the four corners of each rack 114. Each of these grommets receives a spring clip 121 which also extends through an aperture 120 at the end of pin 116. There is a pin 116 at each upper and lower junction of each of elongated links 111 and 112. Thus, as can be seen from FIG. 3, there are nine racks 114 in frame 85, each of which is loosely held by four circular spring clips 121 located at the four junctions of links 111 and 112 on opposite sides of frame 85.

Each rack 114 (FIGS. 4 and 9) is a rigid molded plastic member having alternating ridges 114a and grooves 114b in the pictured pattern. Each rack 114 is essentially formed by pressing a planar piece of plastic into the ridge and groove pattern wherein a ridge on one side of the rack is opposite a groove on the other side. A modified and preferred rack 114' is shown in FIG. 10 wherein the ridges 114a' and grooves 114b' are all inclined downwardly so that the liquid will run downwardly along the ridges and grooves, and will not tend to collect on them, as would be the case with the horizontal ridges and grooves of rack 114.

Frame 85 is connected between fixed platen 32 and movable platen 40 in the following manner. A tab 125 is welded to leg 126 (FIG. 7) of angle 92 of the frame portion 88' (FIG. 3A) which is the mirror image counterpart of frame portion 88 (FIG. 1A). A sleeve-type bearing 127 is welded onto tab 125. A pin 129 in the form of a bolt extends through standards 130 mounted on leg 131 of U-shaped bracket 83 (FIGS. 6 and 7). Pin 129 also extends through tab 125 and sleeve 127. A nut 132 secures bolt 129 in position. At this juncture it is to be noted that bolt 129 has a head 133 which bears against bearing sleeve 134 which is welded to tab 135 which is welded to leg 136 of angle 137 which forms a part of frame 86, angle 137 being substantially identical to angle 89 described above in FIG. 1A. Angle 89 has a leg 140 to which tab 141 is welded and which has a bearing sleeve 142 welded to it for receiving the shank of bolt 143 which is mounted on upstanding side 144 of bracket 145 which is fixedly secured to the upper leg 146 of channel 22. As will be seen hereafter, by virtue of the connection between angles 89 and 96 and pins 129 and 143, frame 85 can pivot outwardly from between fixed platen 32 and movable platen 40.

Figure 3F:
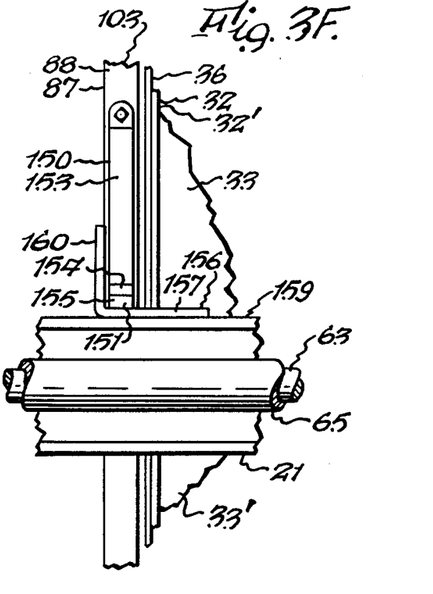
FIG. 3F is a view taken substantially in the direction of arrows 3F—3F of FIG. 3 and showing the details of the combined support and handle.
Figure 3G:
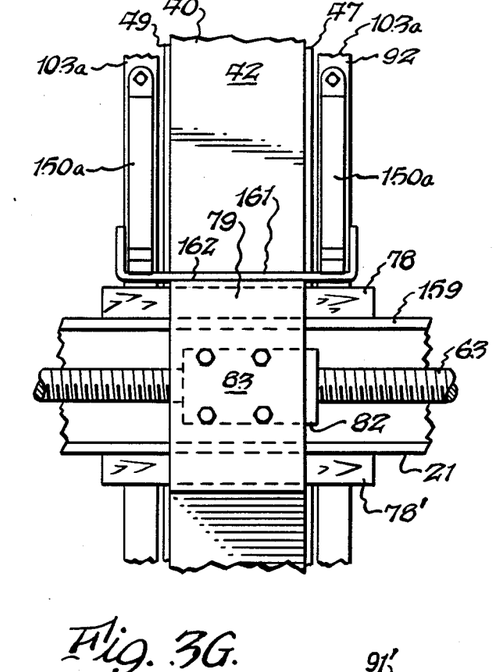
FIG. 3G is a view taken substantially in the direction of arrows 3G—3G of FIG. 3 and showing the details of the other combined support and handle associated with the frame.
Figure 4:
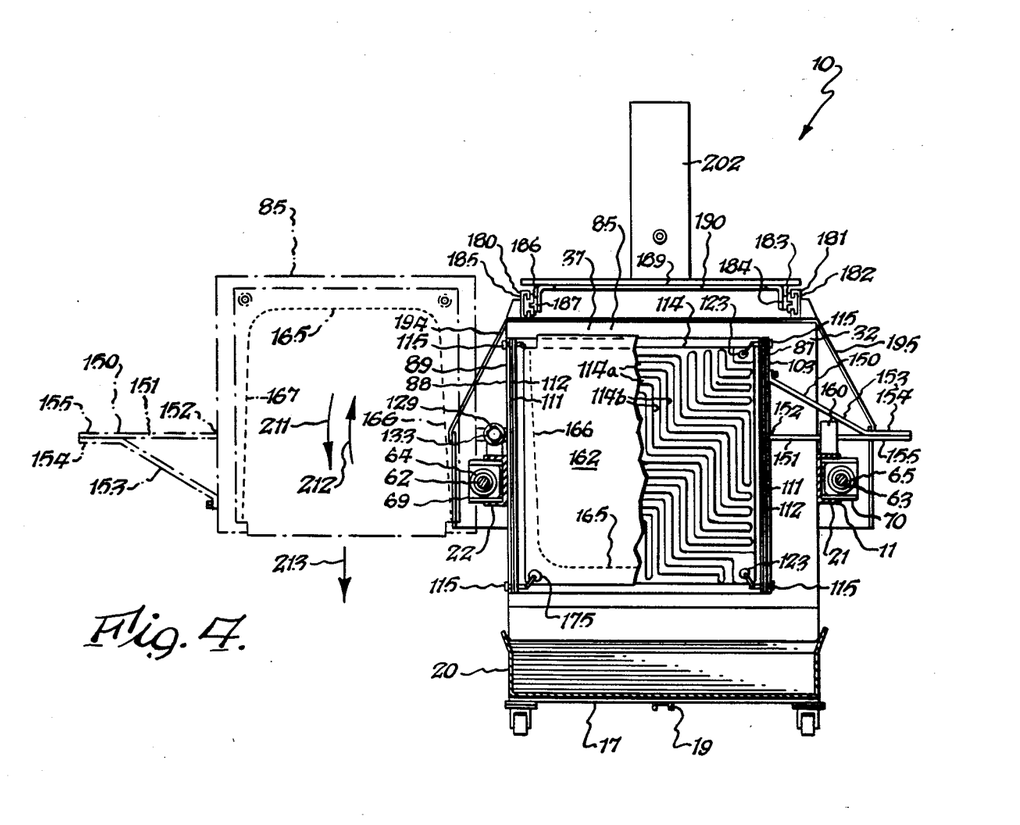
FIG. 4 is a cross sectional view taken substantially along line 4—4 of FIG. 1 and showing various parts of the press with portions broken away.

A combined support and handle 150 is secured to leg 103 of angle 87 of frame member 88 (FIGS. 3 and 4). Combined support and handle 150 includes a horizontal bar 151 (FIG. 4) having its end 152 welded to angle leg 103, and it also includes a diagonal support bar 153 having its upper end welded to angle leg 103 and its lower horizontal portion 154 welded to the outer end portion 155 of bar 151. An angle bracket 156 (FIGS. 3 and 3F) has its horizontal leg 157 welded to the upper leg 159 of channel 21, and it has an upstanding leg 160 which bears against the side of combined handle and support 150. A combined support and handle 150a is attached to the mirror image counterpart angle 103a of angle 87 of frame portion 88'. Combined support and handle 150a, which has essentially the same structure as handle 150, rests on bracket 161 (FIGS. 2, 3 and 3G) which is screwed to the top horizontal leg 162 of U-shaped bracket 82 (FIG. 6). Thus, one side of frame 85 is pivotally supported by pins 129 and 143, and the other side of frame 85 is supported by combined supports and handles 150 and 150a.

Figure 9A:
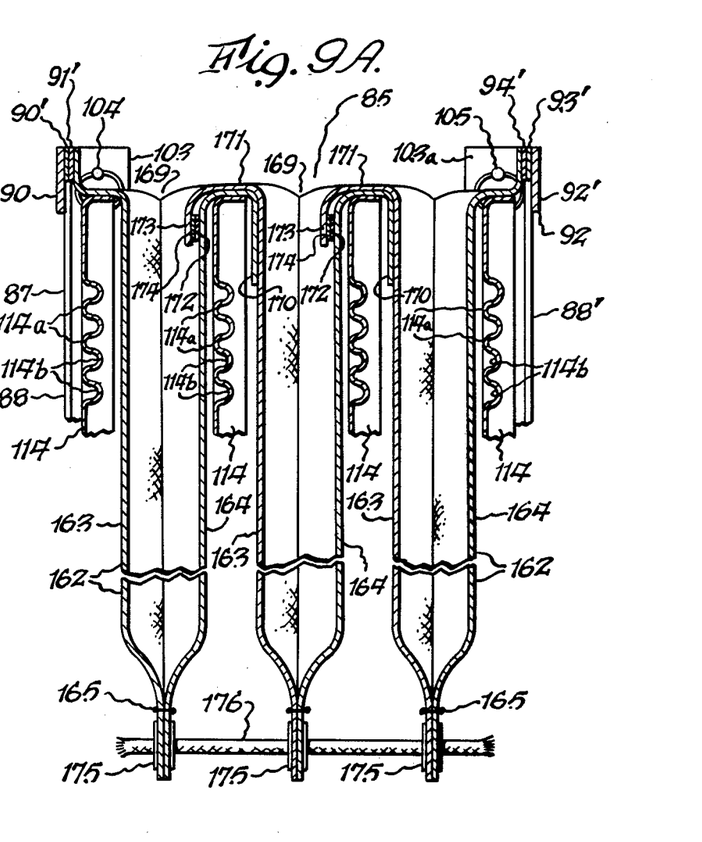
FIG. 9A is a fragmentary cross sectional view taken substantially along line 9A—9A of FIG. 9 and showing the interrelationship between the racks and the bags and the manner in which the bags are mounted on the racks and on the frame.

A porous bag 162, which is made of a duck-like cloth of the type used in cider presses, is positioned between each pair of adjacent racks 114 (FIGS. 3, 9 and 9A). Thus, as can be visualized from FIG. 3, there are eight bags 162 located between the nine racks 114 of frame 85. Each of these bags has an opening 169 (FIGS. 3 and 9A). The bags 162 comprise fabric walls 163 and 164 which are sewn to each other at bottom seam 165. Walls 163 and 164 are also sewn to each other at side seams 166 and 167 which converge downwardly toward bottom seam 165. The top of bag 162 is open at 169. The bags have an outside dimension of about 18 inches wide and 20 inches high. The distance between seams 166 and 167 is about 18 inches at the top and about 15 inches at the bottom. The junctions of seam 165 with seams 166 and 167 are rounded to facilitate removal of pressed residue from these corners.

Each bag 162 is joined to an adjacent bag by a hook and pile connection. In this respect, as can be seen from FIG. 9A, wall 164 has an elongated tab 170 which extends the entire width of wall 164 and it overlies the top edge 171 of rack 114. A strip 172 of hook and pile fastening, which extends substantially for the entire width of wall 164, is sewn to the latter near its top. Each bag 162 has an edge portion 173 which comprises the upper end of wall 163. A strip of hook and pile fastener 174 is sewn substantially across the entire edge portion 173. As can be seen from FIG. 9A, the hook and pile strips 172–174 are connected to each other by pressure after edge portion 170 is draped over the upper end 171 of rack 114 and after the edge portion 173 of wall 163 is draped over edge portion 170. The hook and pile fasteners are known commercially under the trademark Velcro.

It can thus be seen that a bag 162 is installed between each pair of adjacent racks 114 so that there are a number of bags mounted on frame 85. The description given above relative to FIG. 9A applies to the six centrally located bags. However, the two end bags are fastened to the bars, such as 90 of FIG. 1A, by the use of strips of hook and pile fastening, with one strip of the fastening 90' secured to bar 90 and the other strip of the fastening 91' secured to the outer edge portion of the end bag. A similar connection is made between bar 92' of frame portion 92 and the end bag adjacent thereto wherein a strip fastening material 93' is secured to bar 92' and another strip 94' is secured to the flap of the end bag (FIG. 9A). As can be seen from FIGS. 9A and 3, since the flaps of the bags lie across substantially the entire widths of racks 114, crushed material dropped into the openings of the bags will not bypass the bags and fall into tank 20.

As can be seen from FIG. 9, there are grommets 175 in the lower corners of each bag 162. An elastic cord 176 is threaded through each pair of lower grommets 123 of each rack 114 and the lower grommets 175 of each bag. If desired, grommets may also be secured to the upper corners of each bag 162 outside of seams 166 and 167 and an elastic cord may be threaded through these grommets and the upper grommets 123 of each rack. Thus the lower elastic cord 176 is threaded through all of the racks 114 and all of the bags 162 to provide an endless member because the ends of the elastic cord are connected to each other by a clip 177 (FIG. 9). If desired, cord 176 may also extend through suitable apertures in the end frame portions 87 and 92.

The elastic cord 176 secures the bottoms of bags 162 relative to the bottoms of racks 114 while permitting relative movement therebetween, as is required when the scissors linkages expand and contract.

Since frame 86 may be identical in all respects to frame 85, it is deemed that a detailed description thereof is not necessary, and everything which has been said relative to frame 85 is equally applicable to frame 86. Structure is provided on the press for grinding apples and feeding the pomace into the bags when the movable platen 40 has pulled away sufficiently from one of the fixed platens so that the bags 162 are pulled open at their tops. In this respect, two telescoping slide members 180 and 181 are mounted proximate the top of the press. More specifically, telescopic slides 180 and 181 are of the type which are normally used to support file cabinet drawers. Slide 181 includes a fixed member 182 into which a second member 183 telescopes and into which a third member 184 telescopes. These members are supported relative to each other by ball bearings. Telescopic slide 180 includes a stationery member 185 into which member 186 telescopes and into which member 187 telescopes. A table top 189 has one end mounted across members 184 and 187 by elongated bar 190. The opposite end of table top 189 rests on bar 190' which bridges the unexposed ends of slide members 184 and 187. The first ends of members 182 and 185 are supported at the upper ends of fixed platen 32. The opposite ends of members 182 and 185 are supported by struts 191 and 192, respectively, which have their lower ends mounted on legs 15 and 12, respectively. A motor cover 193 has an end portion which rests on the top of fixed platen 32 (FIG. 3) underneath slide members 182 and 185 and it has downwardly depending sides 194 and 195. Angles 196 and 197 connect slide members 185 and 182, respectively, to cover 193, and channels 199 and 200 also connect motor cover 193 to slide members 185 and 182, respectively. The lower ends of motor cover sides 194 and 195 are suitably affixed to struts 192 and 191, respectively.

Figure 12:
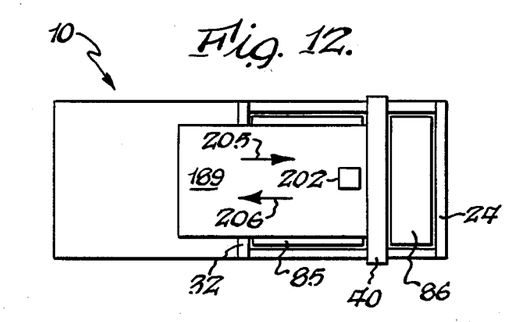
FIG. 12 is a schematic view showing the bags in the left frame being loaded.
Figure 13:
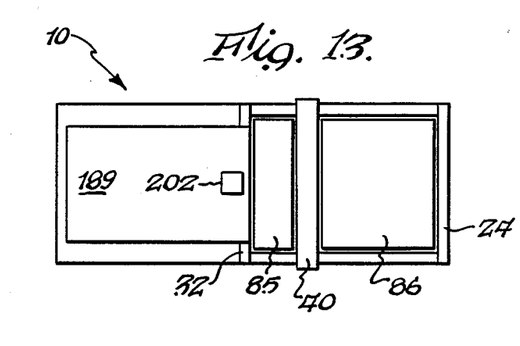
FIG. 13 is a schematic view showing the bags in the left frame being pressed and the bags in the right frame being opened.

In order to fill the bags carried by frame 85 when the movable platen 40 is sufficiently far away from fixed platen 32, the table top 189 is slid outwardly to the position of FIGS. 1, 2 and 12, and apples are deposited into rectangular chute 202. A grinder blade, not shown, within chute 202 is driven by motor 203. If desired, a hopper can also be mounted on table top 189 to feed apples into chute 202 in the direction of arrow 204. The table top 189 is moved back and forth along the openings 169 of the bags and a frame 85 and a probe may be used to distribute the crushed apples into bags 162. The bags will thus be filled substantially to their tops with crushed apples, and the pomace will extend across the entire width of the bags to a thickness of between 2 and 3 inches, which is the optimum thickness for pressing.

Figure 11:
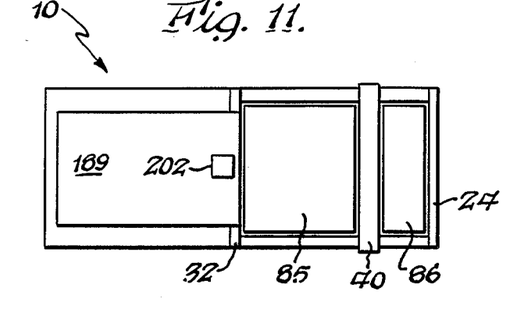
FIG. 11 is a schematic view showing the position of the various parts prior to the time that the bags in the left frame are being loaded.

The foregoing can be more readily appreciated from FIGS. 11 and 12. Before the loading operation begins, movable platen 40 is substantially in the position shown in FIG. 11 so that frame 85 is expanded. This expansion occurs because end members 88 and 96 of frame 85 are fastened to fixed platen 32 and movable platen 40 by the above-described pivotal connections and combined handle and support connections. Thereafter, the table top 189 is moved back and forth in the direction of arrows 205 and 206 to fill the bags carried by frame 85. Because the side seams 166 and 167 converge downwardly, there is a good distribution of pomace because excessive amounts will not accumulate at the bottom.

Motor 54 is then actuated to cause screws 62 and 63 to move platen 40 toward fixed platen 32, thereby causing frame 85 to contract. During this contraction, the scissors links 111 and 112 (FIG. 3A) will approach each other and assume more vertical position, and the upper and lower edges of the scissors linkages will move further apart. However, the vertical dimension of racks 114 will obviously remain the same because they are fabricated from rigid plastic. It is the loose connection between pins 115 and grommets 123 through the floating spring clips 121 that permit the ends of the scissors links at pins 115 to remain connected to the corners of racks 114 while the scissors linkages 93 and 93a increase in height during the contraction of these linkages. The bags 162, being supported by the top edges of racks 114 in the above-described manner, will hang on the racks until such time as adjacent racks press the bags to squeeze the juice out of the pomace contained therein. The movable platen 40 will continue its movement toward fixed platen 32 until eight tons of force are exerted on the pomace through the medium of the racks, each of which is approximately 20 inches square. When this limit is reached, a slip clutch on which sprockets 50 and 56 are mounted will terminate the drive to screws 62 and 63.

Figure 14:
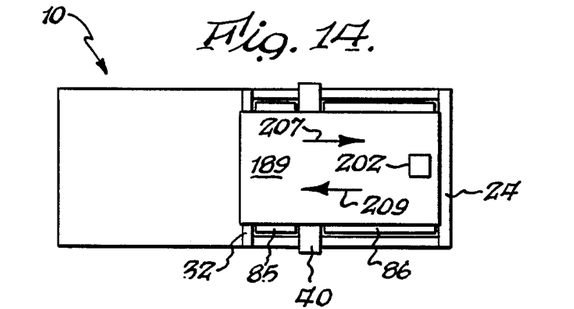
FIG. 14 is a schematic view showing the bags in the right frame being filled while the bags in the left frame are being pressed.

During the time that the bags carried by frame 85 are being pressed, the bags carried by frame 86 will be opened as this frame expands because of the connection between frame 86 and movable platen 40 at one end and the connection between frame 86 and fixed platen 24 at the opposite end. These connections are the mirror images of those described above relative to frame 85. During the opening of frame 86, table top 189 is moved to the position of FIG. 14 and is moved back and forth in the direction of arrows 207 and 209 between movable platen 40 and fixed platen 24 to fill the bags 162 carried by frame 86 as the grinder is operated. After the movable platen has stopped its movement in the direction toward fixed platen 32, the motor 54 is reversed and the movable platen 40 will start its travel toward fixed platen 24. In so doing, the scissors linkages 93 and 93a will start to expand and the scissors linkages of frame 86 will be compressed. This will cause the racks 114 of frame 86 to approach each other to press juice from the pomace carried by bags 162.

Figure 15:
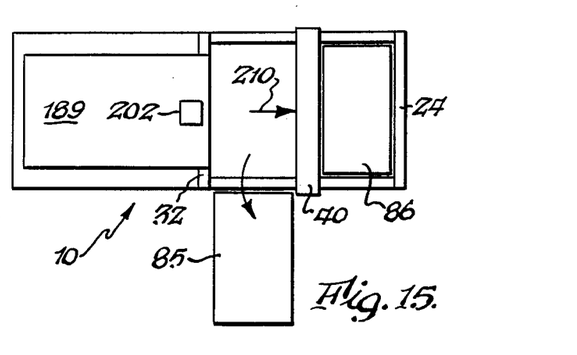
FIG. 15 is a schematic view showing the bags in the right frame being pressed and the bags in the left frame being emptied.

Platen 40 will continue its movement in the direction of arrow 210 (FIG. 15) to press the bags 162 carried in frame 86. A point will be reached where end frame member 88 (FIG. 1A) and its mirror image counterpart 88' will no longer be bearing against fixed platen 32 and movable platen 40, respectively. Furthermore, as the scissors linkages 93 and 93a expand, the racks 114 will be spread apart and further, the openings 169 of bags 162 will also tend to be pulled apart. After scissors linkages 93 and 93a have expanded sufficiently, handles 150 and 150a (FIG. 3) are grasped and frame 85 is swung in a counterclockwise direction in FIG. 4 about pins 129 and 143 to thereby move from its solid-line position to its dotted-line position (FIGS. 4 and 15). Bags 162 carried by frame 85 will thus be inverted so that the seams 166 and 167 will diverge downwardly, as shown in FIG. 4. The handles 150 and 150a are grasped, and the frame 85 is oscillated back and forth in the direction of arrows 211 and 212 to bang frame 85 against channel 22. The combination of pulling the bags 162 to a more open position, as indicated above, and the banging of the frame 85 will loosen the pressed pomace so that it will fall out of bags 162 in the direction of arrow 213 into suitable containers (not shown). It is to be especially noted that the bags are conveniently emptied to the side of the press.

Figure 16:
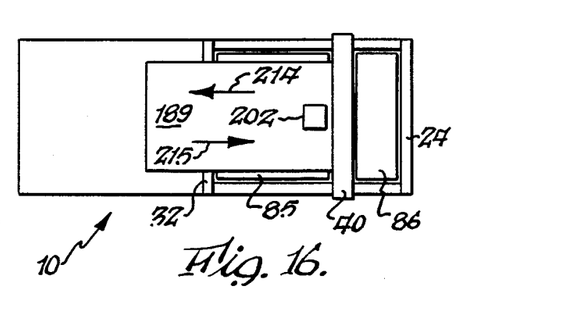
FIG. 16 is a schematic view showing the continuance of pressing of the bags in the right frame while the bags in the left frame are being loaded.
Figure 17:
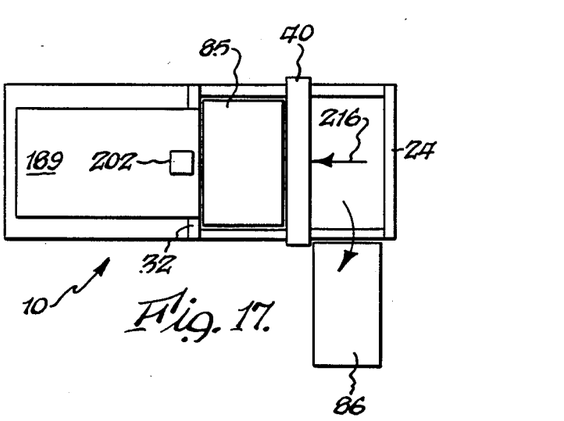
FIG. 17 is a schematic view showing the bags in the left frame being pressed while the bags in the right frame are being emptied.

After the bags 162 in frame 85 have been emptied in the above-described manner, frame 85 is rotated in a clockwise direction in FIG. 4 so that it returns to its full line position. Thereafter, as shown in FIG. 16, the table top 189 is moved over frame 85 and is reciprocated in the direction of arrows 214 and 215 to supply crushed apples to the bags 162 which are now held with their tops open because the frame 85 has been expanded. The bags in frame 85 are filled while the bags in frame 86 are being pressed. The pressing of the bags 162 in frame 86 is continued until such time as the slip clutch associated with motor 54 senses eight tons of pressure whereupon the movement of movable platen 40 will cease. Thereafter, motor 54 is reversed and movable platen will be caused to move in the direction of arrow 216 (FIG. 17) to press the pomace carried by bags 162 in frame 85 as movable platen 40 moves toward fixed platen 32. After movable platen 40 has moved sufficiently far from fixed platen 24, frame 86 is pivoted outwardly from its position between platens 24 and 40 in the same manner as described above relative to frame 85 because it is mounted in an identical manner and for all practical purposes is completely identical to frame 85 both in its construction and its manner of mounting. Frame 86 is then banged back and forth on channel member 22 to dump the pressed pomace therein, and it is thereafter pivoted back into position between movable platen 40 and fixed platen 24, and, as the linkages expand and the bags 162 carried in frame 86 open up, the procedure described above relative to FIG. 14 is repeated to fill bags 162 carried by frame 86 as the bags 162 carried by frame 85 are being pressed.

It can thus be seen that the frames 85 and 86 are alternately operable to (1) press and (2) dump and fill, thereby providing a continuous pressing operation. In addition, it is to be especially noted that the juice is being squeezed from bags which are between 2 to 3 inches thick, to thereby provide a combination of maximum yield and purity. Furthermore, the loading of the pomace and the dumping of the pressed pomace is extremely simple and expedient, thereby obviating the problems associated with prior presses which were extremely labor intensive.

It will be appreciated that the juice which is pressed from the pomace runs into the tank 20 from which it may be pumped by a suitable pump (not shown). It is desirable that plastic curtains be suspended from the upper edges of each of the scissors linkages to direct downwardly into tank 20 and juices which tend to squirt out sideways. These curtains may be in the general nature of shower curtains and may be accordian-pleated to expand and contract with the scissors linkages. A suitable means of connection will be by the use of grommets in the curtains which are interposed between pin heads 119 (FIG. 8) and scissors links 112.

While the above description has been directed specifically to a cider press, it will be appreciated that it is equally applicable to the pressing of other fruit pomaces and may also be used with other edible and nonedible materials where the pressing has to be effected in thin layers and where it is desired to dump the pressed residue quickly and efficiently. Accordingly, the following claims are directed to a press for pressing liquid from a liquid containing mass.

In the above press, the liquid which is pressed from the thin layers of liquid-containing mass, which are 2–3 inches thick, are pressed for a period of 10–30 minutes, depending on the amount of liquid which is to be extracted. By way of example, approximately 98% of the liquid from apple pomace pressed in 3 inch layers will be expressed in about 20 minutes, which is the optimum time for maximum extraction. By pressing within the foregoing time parameters, the pulp of the pomace itself acts as a filter, thereby causing an extremely clear liquid to be obtained. If pressing is speeded up beyond a certain point, the self-filtering action will not occur, and the liquid will contain undesirable amounts of suspended solids which have to be subsequently filtered. Thus, the present press provides a relatively high output of relatively clear liquid by a combination of multi-layer pressing at relatively slow speeds.

While a specific structure has been shown for inverting the bag carrying frames for facilitating the dumping of pressed residue contained therein, it will be appreciated that the present invention is not limited thereto because other arrangements may be utilized for installing and removing the bag-carrying frames between the platens and such other arrangements may encompass booms or cranes or the like which load the racks into the space between the platens and which remove the racks and invert them. The foregoing structure is contemplated within the scope of certain of the following claims.

While the foregoing description has referred to a series of individual bags which are connected by hook and pile type of fasteners and which can be separated removed and replaced with other bags, it will be appreciated that the present invention contemplates that a series of bags, such as 62, may be permanently sewn to each other so as to comprise one complete unit.

It can thus be seen that the improved press of the present invention is manifestly capable of achieving the above-enumerated objects, and while preferred embodiments have been disclosed, it will be appreciated that the present invention is not limited thereto but may be otherwise embodied within the scope of the following claims.

What is claimed is:

1. A press for pressing liquid from a liquid-containing mass comprising a press frame, spaced horizontal frame members on said press frame, first and second vertical stationary platens spacedly mounted on said horizontal frame members, a horizontally movable vertical platen mounted on said horizontal frame members and having a first side facing said first stationary platen and a second side facing said second stationary platen, a plurality of first horizontally spaced vertical racks, first mounting means mounting said first vertical racks between said first fixed platen and said first side of said movable platen, a plurality of second horizontally spaced vertical racks, second mounting means mounting said second racks between said second fixed platen and said second side of said movable platen, a plurality of first porous bags having first openings at their upper ends, third mounting means mounting said first porous bags between said first racks, a plurality of second porous bags having second openings at their upper ends, fourth mounting means mounting said second porous bags between said second racks, and linkage means for moving said movable platen toward and away from said first and second fixed platens whereby liquid-containing masses in said first or second bags may be pressed while the solids remaining after pressing in the other of said first or second bags may be removed and additional liquid-containing masses may be placed into said other of said first or second bags.

2. A press as set forth in claim 1 including bag-filling means, and means mounting said bag-filling means on said frame for movement to positions over said first and second bags.

3. A press as set forth in claim 1 wherein said first and second bags have opposed side seams which converge downwardly from said first and second openings, respectively.

4. A press as set forth in claim 3 including a first frame and a second frame, and wherein said first mounting means and said third mounting means mount said first vertical racks and said first porous bags, respectively, on said first frame, and wherein said second mounting means and said fourth mounting means mount said second vertical racks and said second porous bags, respectively, on said second frame, first means for permitting removal of said first frame from between said movable platen and said first fixed platen, and second means for permitting removal of said second frame from between said movable platen and said second fixed platen.

5. A press as set forth in claim 4 wherein said first and second means are first and second pivotal connections to said first and second frames, respectively, for pivoting said first and second frames about one of said spaced horizontal frame members from upright positions with said first and second openings of said first and second bags facing upwardly while said first and second frames are located between said platens to inverted positions with said first and second openings facing downwardly while said first and second frames are positioned outside of said platens, whereby material remaining in said first and second bags may be dumped therefrom while said frames are positioned outside of said platens.

6. A method of pressing liquid from liquid-containing masses comprising the steps of mounting a plurality of relatively thin porous bags in interspersed relationship with racks on a frame, said bags having openings at their tops facing upwardly, filling liquid-containing masses into said plurality of relatively thin porous bags through said openings, applying a pressing force to each of said plurality of relatively thin bags through said racks to press liquid from said liquid-containing masses therein, relieving said pressing force from said bags, and inverting as a unit said frame and said racks and said bags to discharge from the openings of said bags the residue of said liquid-containing masses.

7. A method as set forth in claim 6 including the step of agitating said frame to facilitate said discharge of said residue.

8. A press for pressing liquid from a liquid-containing mass comprising a frame, first and second spaced vertical platens, a plurality of vertical racks, first mounting means for mounting said plurality of vertical racks between said first and second vertical platens in substantially parallel relationship to each other and to said first and second platens, a plurality of porous bags for receiving said liquid-containing mass, second mounting means for mounting said plurality of porous bags in interspersed relationship with said plurality of vertical racks, means for effecting relative movement of said first and second platens toward each other to cause said racks to effect a pressing relationship with said bags to force liquid out of said liquid-containing mass in said bags and to cause said first and second platens to move away from each other to terminate the pressing relationship between said racks and said porous bags, said porous bags being closed on their bottom edges and on their vertical sides and having openings on their top edges, said racks having top edges adjacent said top edges of said porous bags, and means proximate said top edges of said porous bags for mounting said porous bags relative to said top edges of said racks so that there are substantially no open spaces between said openings of said porous bags and said top edges of said racks, said means proximate said top edges of said porous bags comprising flaps securing adjacent porous bags to each other and overlying said top edges of said racks.

9. A press for pressing liquid from a liquid-containing mass comprising a frame, first and second spaced vertical platens, a plurality of vertical racks, first mounting means for mounting said plurality of vertical racks between said first and second vertical platens in substantially parallel relationship to each other and to said first and second platens, a plurality of porous bags for receiving said liquid-containing mass, second mounting means for mounting said plurality of porous bags in interspersed relationship with said plurality of vertically racks, means for effecting relative movement of said first and second platens toward each other to cause said racks to effect a pressing relationship with said bags to force liquid out of said liquid-containing mass in said bags and to cause said first and second platens to move away from each other to terminate the pressing relationship between said racks and said porous bags said first mounting means comprising a second frame mounted on said first frame for mounting said racks and bags in parallel relationship and for maintaining said racks and bags in said parallel relationship in all positions thereof, and third mounting means for mounting said second frame for movement laterally to a second position outside of the space between said first and second platens including means for inverting said second frame to thereby invert said porous bags.

10. A press as set forth in claim 9 wherein said means for inverting said second frame comprise pivot means on said second frame for permitting said second frame to pivot outwardly to said second position while said racks remain substantially parallel to each other and to said to said first and second platens, whereby said porous bags in said second position will be inverted from the positions which they occupied when said second frame was located between said first and second platens.

11. A press as set forth in claim 10 wherein said pivot means are effectively located between said second frame and said first and second platens.

12. A press as set forth in claim 9 wherein said side edges of said porous bags effectively converge downwardly when they are located between said first and second platens, and wherein said side edges of said porous edges diverge downwardly when in said second position to thereby facilitate release of deliquified residue after liquid has been pressed from said liquid-containing mass.

13. A press for pressing liquid from a liquid-containing mass comprising a frame, first and second spaced vertical platens, a plurality of vertical racks, first mounting means for mounting said plurality of vertical racks between said first and second vertical platens in substantially parallel relationship to each other and to said first and second platens, a plurality of porous bags for receiving said liquid-containing mass, second mounting means for mounting said plurality of porous bags in interspersed relationship with said plurality of vertical racks, means for effecting relative movement of said first and second platens toward each other to cause said racks to effect a pressing relationship with said bags to force liquid out of said liquid-containing mass in said bags and to cause said first and second platens to move away from each other to terminate the pressing relationship between said racks and said porous bags, said racks including upper and lower portions, said first mounting means comprising a second frame, first and second scissors linkages on opposite sides of said second frame, upper and lower ends on said first and second scissors linkages, said first and second scissors linkages including first and second elongated links having upper and lower ends, pivot means intermediate said upper and lower ends for pivotally connecting said elongated links to each other, and loose connection means connecting said upper portions of said racks relative to said upper ends of said first and second scissors linkages.

14. A press as set forth in claim 13 including second loose connection means for connecting said lower portions of said racks relative to said lower ends of said first and second scissors linkages.

15. A press as set forth in claim 14 wherein said porous bags are closed on their bottom edges and on their vertical sides and have openings on their top edges.

16. A press as set forth in claim 15 including third loose connection means for connecting said bottom edges relative to said lower portions of said racks.

17. A press for pressing liquid from a liquid-containing mass comprising a first frame, first and second spaced vertical platens, first mounting means for mounting said first and second spaced vertical platens on said first frame, a plurality of vertical racks, a second frame, second mounting means for mounting said second frame on said first frame, third mounting means for mounting said plurality of vertical racks on said second frame between said first and second vertical platens in substantially parallel relationship to each other and to said first and second platens, a plurality of porous bags having open tops for receiving said liquid-containing mass, fourth mounting means for mounting said plurality of porous bags on said second frame for movement therewith, said plurality of porous bags being mounted on said second frame in interspersed relationship with said plurality of vertical racks, means for effecting relative movement of said first and second platens toward each other to cause said racks to effect a pressing relationship with said bags to force liquid out of said liquid-containing mass in said bags and to cause said first and second platens to move away from each other to terminate the pressing relationship between said racks and said porous bags, and means for moving said second frame and said porous bags mounted thereon for movement therewith to an inverted position outside of the space between said first and second platens to thereby invert said porous bags to discharge the residue of said liquid-containing masses from said open tops of said porous bags.

18. A press for pressing liquid for a liquid-containing mass comprising a first frame, first and second spaced vertical platens, first mounting means for mounting said first and second spaced vertical platens on said first frame, a plurality of vertical racks, a second frame, second mounting means for mounting said second frame on said first frame, third mounting means for mounting said plurality of vertical racks on said second frame between said first and second vertical platens in substantially parallel relationship to each other and to said first and second platens, a plurality of porous bags having open tops for receiving said liquid-containing mass, fourth mounting means for mounting said plurality of porous bags on said second frame for movement therewith, said plurality of porous bags being mounted on said second frame in interspersed relationship with said plurality of vertical racks, means for effecting relative movement of said first and second platens toward each other to cause said racks to effect a pressing relationship with said bags to force liquid out of said liquid-containing mass in said bags and to cause said first and second platens to move away from each other to terminate the pressing relationship between said racks and said porous bags, means for moving said second frame and said porous bags mounted thereon to a position outside of the space between said first and second platens, and means for inverting said second frame and said porous bags mounted thereon for movement therewith to thereby invert said porous bags to discharge the residue of said liquid-containing masses from said open tops of said porous bags.

19. A press for pressing liquid from a liquid-containing mass comprising a frame, first and second spaced vertical platens, a plurality of vertical racks, first mounting means for mounting said plurality of vertical racks between said first and second vertical platens in substantially parallel relationship to each other and to said first and second platens, a plurality of porous bags for receiving said liquid-containing mass, second mounting means for mounting said plurality of porous bags in interspersed relationship with said plurality of vertical racks, means for effecting relative movement of said first and second platens toward each other to cause said racks to effect a pressing relationship with said bags to force liquid out of said liquid-containing mass in said bags and to cause said first and second platens to move away from each other to terminate the pressing relationship between said racks and said porous bags, said first mounting means comprising a second frame, and third mounting means for mounting said second frame for movement laterally to a second position outside of the space between said first and second platens including means for inverting said second frame to thereby invert said porous bags, said means for inverting said second frame comprising pivot means on said second frame for permitting said second frame to pivot outwardly to said second position while said racks remain substantially parallel to each other and to said first and second platens, whereby said porous bags in said second position will be inverted from the positions which they occupied when said second frame was located between said first and second platens, said racks including upper and lower portions, and said second frame including first and second scissors linkages on opposite sides thereof, said first and second scissors linkages including first and second elongated links having upper and lower ends for pivotally connecting said elongated links to each other, and loose connection means connecting said upper portions of said racks relative to said upper ends of said first and second scissors linkages.

20. A press as set forth in claim 19 including second loose connection means for connecting said lower portions of said racks relative to said lower ends of said first and second scissors linkages.

21. A press as set forth in claim 20 wherein said porous bags are closed on their bottom edges and on their vertical sides and have openings on their top edges.

22. A press as set forth in claim 21 including third loose connection means for connecting said bottom edges relative to said lower portions of said racks.

23. A press as set forth in claim 22 wherein said porous bags include first grommets on said lower edges, and wherein said racks include second grommets on their lower portions, and wherein said third loose connections means comprise a flexible cord threaded through said first and second grommets.

24. A press for pressing liquid from a liquid-containing mass comprising a frame, first and second spaced vertical platens, a plurality of vertical racks, first mounting means for mounting said plurality of vertical racks between said first and second vertical platens in substantially parallel relationship to each other and to said first and second platens, a plurality of porous bags for receiving said liquid-containing mass, second mounting means for mounting said plurality of porous bags in interspersed relationship with said plurality of vertical racks, means for effecting relative movement of said first and second platens toward each other to cause said racks to effect a pressing relationship with said bags to force liquid out of said liquid-containing mass in said bags and to cause said first and second platens to move away from each other to terminate the pressing relationship between said racks and said porous bags, said first mounting means comprising a second frame, and third mounting means for mounting said second frame for movement laterally to a second position outside of the space between said first and second platens including means for inverting said second frame to thereby invert said porous bags, said means for inverting said second frame comprising pivot means on said second frame for permitting said second frame to pivot outwardly to said second position while said racks remain substantially parallel to each other and to said first and second platens, whereby said porous bags in said second position will be inverted from the positions which they occupied when said second frame was located between said first and second platens, said first frame including a side frame member, and said pivot means causing said side portions of said second frame to abut said side frame member in the inverted position.

25. A press for pressing liquid from a liquid-containing mass comprising a first frame, first and second spaced vertical platens, first mounting means for mounting said first and second spaced vertical platens on said first frame, a plurality of vertical racks, a second frame, second mounting means for mounting said second frame on said first frame, third mounting means for mounting said plurality of vertical racks on said second frame between said first and second vertical platens in substantially parallel relationship to each other and to said first and second platens, a plurality of porous bags having open tops for receiving said liquid-containing mass, fourth mounting means for mounting said plurality of porous bags on said second frame for movement therewith, said plurality of porous bags being mounted on said second frame in interspersed relationship with said plurality of vertical racks, means for effecting relative movement of said first and second platens toward each other to cause said racks to effect a pressing relationship with said bags to force liquid out of said liquid-containing mass in said bags and to cause said first and second platens to move away from each other to terminate the pressing relationship between said racks and said porous bags mounted thereon for movement therewith to an inverted position to thereby invert said porous bags to discharge the residue of said liquid-containing masses from said open tops of said porous bags.

26. A press for pressing liquid as set forth in claim 25 wherein each of said porous bags comprises first and second porous fabric side walls positioned in contiguous relationship and each having a bottom edge and a pair of side edges and a top edge, first seam means connecting said bottom edges to each other to thereby provide a closed bottom to said bag when said bag is in said upright position, opening means between said top edges for receiving said liquid-containing mass when said bag is in said upright position with said opening means at the top of said bag, and a pair of second spaced seam means connecting adjacent side edges of said fabric side walls positioned in said contiguous relationship, said second seam means converging toward said bottom edges when said bag is in said upright position, said second seam means also diverging toward said opening means between said top edges when said bag is inverted from said upright position to thereby facilitate discharging of said deliquified residue.

27. A porous bag for mounting in a press for pressing liquid from a liquid-containing mass when said bag is in an upright position and for discharging deliquified residue when said bag is in an inverted position after said liquid has been pressed from said liquid-containing mass comprising first and second substantially planar porous fabric side walls positioned in contiguous relationship and each having a bottom edge and a pair of side edges and a top edge, first means connecting said bottom edges to each other to thereby provide a closed bottom to said bag when said bag is in said upright position, opening means between said top edges defining an open mouth for receiving said liquid-containing mass when said bag is in said upright position with said opening means at the top of said bag, and second means connecting adjacent side edges of said fabric side walls positioned in said contiguous relationship, said second means causing said side edges to converge toward said bottom edges substantially throughout their entire extent when said bag is in said upright position to provide a downwardly converging chamber within said bag, said second means also causing said side edges to diverge substantially throughout their entire extent toward said opening means between said top edges when said bag is inverted from said upright position to thereby provide a downwardly diverging chamber substantially throughout its entire extent within said bag to facilitate discharging of said deliquified residue, flap means forming a continuation of one of said side walls and extending away from said opening means for attachment to a side wall of an adjacent bag when said bag is mounted in said press, and spaced grommet means proximate the junctions of said bottom edges and said side edges.

28. A porous bag construction for mounting in a press for pressing liquid from a liquid-containing mass when said bag construction is in an upright position and for discharging deliquified residue when said bag construction is in an inverted position after said liquid has been pressed from said liquid-containing mass comprising a plurality of bags, each bag comprising first and second substantially planar porous fabric side walls positioned in contiguous relationship and each having a bottom edge and a pair of side edges and a top edge, first means connecting said bottom edges to each other to thereby provide a closed bottom to said bag when said bag is in said upright position, opening means between said top edges defining an open mouth for receiving said liquid-containing mass when said bag is in said upright position with said opening means at the top of said bag, and second means connecting adjacent side edges of said fabric side walls positioned in said contiguous relationship, said second means causing said side edges to converge toward said bottom edges substantially throughout their entire extent when said bag is in said upright position to provide a downwardly converging chamber within said bag, said second means also causing said side edges to diverge substantially throughout their entire extent toward said opening means between said top edges when said bag is inverted from said upright position to thereby provide a downwardly diverging chamber substantially throughout its entire extent within said bag to facilitate discharging of said deliquified residue, flap means of at least substantially the same width as the opening means of said bags extending between said top edges of adjacent bags, whereby said bag construction comprises a plurality of said bags connected by said flap means when said plurality of bags are mounted in said press, and spaced grommet means proximate the junctions of said bottom edges and said side edges of each of said bags.

* * * * *

UNITED STATES PATENT AND TRADEMARK OFFICE
CERTIFICATE OF CORRECTION

PATENT NO. : 4,892,665
DATED : January 9, 1990
INVENTOR(S) : Dale E. Wettlaufer

It is certified that error appears in the above-identified patent and that said Letters Patent is hereby corrected as shown below:

Column 13, line 38 (claim 6), change "of" to --for--.

Column 14, line 23 (claim 9), change "vertically" to --vertical--.

Column 14, line 45 (claim 10), after "said" (first occurrence) insert --bags and--.

Column 14, line 56 (claim 12), change "edges" to --bags--.

Column 15, line 59 (claim 18), change "for" (second occurrence) to --from--.

UNITED STATES PATENT AND TRADEMARK OFFICE
CERTIFICATE OF CORRECTION

PATENT NO. : 4,892,665

DATED : January 9, 1990

INVENTOR(S) : Dale e. Wettlaufer

Page 2 of 2

It is certified that error appears in the above-identified patent and that said Letters Patent is hereby corrected as shown below:

Column 16, line 58 (claim 19), after "ends" insert --, second pivot means intermediate said upper and lower ends--.

Column 17, line 67 (claim 25), after "bags" insert --, and means for moving said second frame and said porous bags--.

Signed and Sealed this

Second Day of July, 1991

Attest:

HARRY F. MANBECK, JR.

*Attesting Officer*

*Commissioner of Patents and Trademarks*